United States Patent
Saito (10) Patent No.: US 12,551,172 B2
(45) Date of Patent: Feb. 17, 2026

(54) X-RAY CT APPARATUS WITH FOCAL POINT CORRECTION BASED ON ENERGY

(71) Applicant: CANON MEDICAL SYSTEMS CORPORATION, Tochigi (JP)

(72) Inventor: Yasuo Saito, Nasushiobara (JP)

(73) Assignee: CANON MEDICAL SYSTEMS CORPORATION, Tochigi (JP)

(*) Notice: Subject to any disclaimer, the term of this patent is extended or adjusted under 35 U.S.C. 154(b) by 196 days.

(21) Appl. No.: 18/475,375

(22) Filed: Sep. 27, 2023

(65) Prior Publication Data

US 2024/0099670 A1    Mar. 28, 2024

(30) Foreign Application Priority Data

Sep. 27, 2022 (JP) .................... 2022-154115

(51) Int. Cl.
  *A61B 6/03* (2006.01)
  *A61B 6/42* (2024.01)

(52) U.S. Cl.
  CPC ............ *A61B 6/032* (2013.01); *A61B 6/4241* (2013.01)

(58) Field of Classification Search
  CPC ............................. A61B 6/032; A61B 6/4241
  See application file for complete search history.

(56) References Cited

U.S. PATENT DOCUMENTS

| | | | | |
|---|---|---|---|---|
| 5,566,220 A * | 10/1996 | Saito | ............ | H05G 1/26 378/138 |
| 6,088,425 A * | 7/2000 | Ono | ............ | H05G 1/26 378/118 |
| 6,907,100 B2 * | 6/2005 | Taguchi | ............ | A61B 6/4085 378/19 |
| 10,575,391 B2 | 2/2020 | Proksa et al. | | |
| 10,743,834 B2 | 8/2020 | Kato et al. | | |
| 2006/0182228 A1 * | 8/2006 | Toth | ............ | A61B 6/4021 378/205 |
| 2009/0161815 A1 | 6/2009 | Grass et al. | | |
| 2011/0007866 A1 * | 1/2011 | Ishikawa | ............ | A61B 6/4488 378/4 |
| 2011/0238354 A1 * | 9/2011 | Tonami | ............ | A61B 6/5258 702/104 |
| 2012/0170708 A1 * | 7/2012 | Tsubota | ............ | A61B 6/032 378/7 |

(Continued)

FOREIGN PATENT DOCUMENTS

| | | |
|---|---|---|
| JP | 2009-532161 A | 9/2009 |
| JP | 2018-57655 A | 4/2018 |

(Continued)

*Primary Examiner* — Blake C Riddick
(74) *Attorney, Agent, or Firm* — Oblon, McClelland, Maier & Neustadt, L.L.P.

(57) ABSTRACT

An X-ray Computed Tomography (CT) apparatus according to an embodiment includes storage circuitry and processing circuitry. The storage circuitry is configured to store therein a table keeping first information about an energy spectrum of X-rays in correspondence with second information about a focal point position of an X-ray tube. The processing circuitry is configured to obtain third information about an energy spectrum of X-rays emitted from the X-ray tube. The processing circuitry is configured to specify a corrected focal point position on the basis of the third information and the table.

8 Claims, 5 Drawing Sheets

(56) References Cited

U.S. PATENT DOCUMENTS

| | | | | |
|---|---|---|---|---|
| 2013/0223588 A1* | 8/2013 | Kurochi | ................... | A61B 6/06 |
| | | | | 378/19 |
| 2014/0153691 A1* | 6/2014 | Kurochi | ............... | A61B 6/4291 |
| | | | | 378/19 |
| 2015/0198725 A1* | 7/2015 | Tamura | ..................... | G01T 1/17 |
| | | | | 378/5 |
| 2015/0282778 A1* | 10/2015 | Kato | .................... | G06T 11/005 |
| | | | | 378/5 |
| 2015/0287221 A1* | 10/2015 | Takayama | ............ | G06T 11/005 |
| | | | | 378/91 |
| 2016/0120485 A1* | 5/2016 | Sakai | .................... | A61B 6/107 |
| | | | | 378/4 |
| 2018/0098746 A1 | 4/2018 | Kato et al. | | |
| 2018/0172606 A1* | 6/2018 | Monkawa | ............ | A61B 6/4021 |
| 2018/0211417 A1* | 7/2018 | Miyazaki | ............. | G01N 23/046 |
| 2018/0270939 A1 | 9/2018 | Proksa et al. | | |
| 2018/0300909 A1* | 10/2018 | Tamura | ................ | G06T 11/008 |
| 2018/0358198 A1* | 12/2018 | Du | ........................ | H01J 37/243 |
| 2019/0000409 A1* | 1/2019 | Tamura | ................ | A61B 6/545 |
| 2019/0021687 A1* | 1/2019 | Kato | .................... | A61B 6/4488 |
| 2020/0129137 A1* | 4/2020 | Tsuyuki | ................ | A61B 6/027 |
| 2022/0000437 A1* | 1/2022 | Lai | ....................... | A61B 6/4241 |
| 2023/0419564 A1* | 12/2023 | Tsuyuki | ................ | A61B 6/035 |

FOREIGN PATENT DOCUMENTS

| | | |
|---|---|---|
| JP | 2019-503039 A | 1/2019 |
| WO | WO 2019/012686 A1 | 1/2019 |

* cited by examiner

| INFORMATION ABOUT ENERGY SPECTRUM OF X-RAYS | INFORMATION ABOUT FOCAL POINT POSITION OF X-RAY TUBE ⌐35a |
|---|---|
| ⋮ | ⋮ |
| ... | ... |

X-RAY CT APPARATUS WITH FOCAL POINT CORRECTION BASED ON ENERGY

CROSS-REFERENCE TO RELATED APPLICATIONS

This application is based upon and claims the benefit of priority from Japanese Patent Application No. 2022-154115, filed on Sep. 27, 2022; the entire contents of which are incorporated herein by reference.

FIELD

Embodiments described herein relate generally to an X-ray Computed Tomography (CT) apparatus.

BACKGROUND

Conventionally, photon counting CT apparatuses are known as X-ray CT apparatuses capable of performing a photon counting CT scan. In such a photon counting CT scan, it is possible to acquire information (energy information) about a plurality of arbitrary energy levels, by using an X-ray detector.

Further, a conventional X-ray CT apparatus uses information about a focal point position of an X-ray tube when performing an image reconstructing process. In this regard, during a CT scan (CT imaging), the focal point position of the X-ray tube may inadvertently move, due to thermal expansion of a shaft on the anode side of the X-ray tube, or the like. For this reason, for example, an X-ray CT apparatus conventionally known is configured to specify the focal point position of the X-ray tube during a CT scan by using a collimator (a pin hole collimator) having a pin hole formed therein and to perform a reconstructing process by using information about the specified focal point position of the X-ray tube.

In relation to the above, there is a demand for being able to specify, during a CT scan, the information about the focal point position of the X-ray tube, without using a pin hole collimator.

DETAILED DESCRIPTION

One of the problems to be solved by embodiments of the present disclosure is to specify, during a CT scan, information about a focal point position of an X-ray tube, without using a pin hole collimator. However, the problems to be solved by the embodiments of the present disclosure are not limited to the problem described above. It is also possible to consider problems corresponding to advantageous effects of the configurations described in the following embodiments as other problems.

An X-ray CT apparatus according to an embodiment includes storage circuitry and processing circuitry. The storage circuitry is configured to store therein a table keeping first information about an energy spectrum of X-rays in correspondence with second information about a focal point position of an X-ray tube. The processing circuitry is configured to obtain third information about an energy spectrum of X-rays emitted from the X-ray tube. The processing circuitry is configured to specify a corrected focal point position on the basis of the third information and the table.

Exemplary embodiments of an X-ray CT apparatus will be explained below, with reference to the accompanying drawings. The description of any of the embodiments and the modification examples is, in principle, similarly applicable to any other embodiment or modification example, as long as no conflict occurs.

First Embodiment

Figure 1:
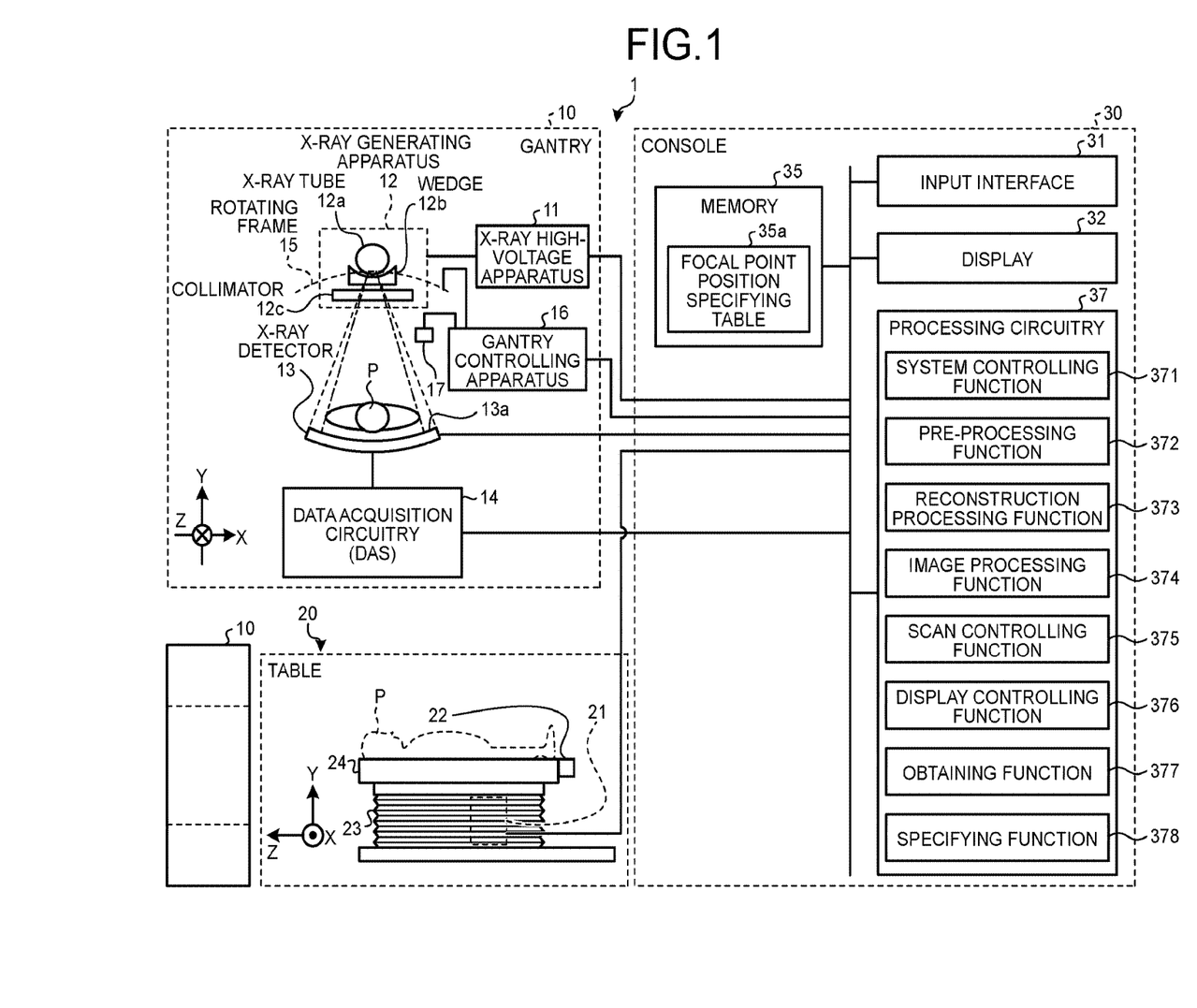
FIG. 1 is a diagram illustrating an exemplary configuration of an X-ray CT apparatus according to a first embodiment.

FIG. 1 is a diagram illustrating an exemplary configuration of an X-ray CT apparatus 1 according to a first embodiment. The X-ray CT apparatus 1 is a photon counting CT apparatus capable of performing a photon counting CT scan (photon counting CT imaging). In other words, the X-ray CT apparatus 1 is an apparatus capable of reconstructing X-ray CT image data having a high Signal-to-Noise (S/N) ratio, by counting photons of X-rays that have passed through an examined subject (hereinafter, "patient") P, while using a photon counting detector based on a photon counting scheme, instead of a conventional integration-type detector (based on a current mode measuring scheme). As illustrated in FIG. 1, the X-ray CT apparatus 1 according to the first embodiment includes a gantry 10, a table 20, and a console 30.

The gantry 10 is an apparatus configured to radiate X-rays onto the patient P and to acquire data related to the X-rays that have passed through the patient P. The gantry 10 includes an X-ray high-voltage apparatus 11, an X-ray generating apparatus 12, an X-ray detector 13, data acquisition circuitry 14, a rotating frame 15, a gantry controlling apparatus 16, and a pin hole collimator 17. Further, as illustrated in FIG. 1, with the gantry 10, an orthogonal coordinate system having an X-axis, a Y-axis, and a Z-axis is defined. In other words, the X-axis indicates a horizontal direction, while the Y-axis indicates a vertical direction, whereas the Z-axis indicates a rotation center axis direction of the rotating frame 15 observed while the gantry 10 is in a non-tilted state.

The rotating frame 15 is an annular frame configured to support the X-ray generating apparatus 12 and the X-ray detector 13 so as to oppose each other while the patient P is interposed therebetween and configured to be rotated by the gantry controlling apparatus 16 (explained later) at a high speed on a circular orbit centered on the patient P.

The X-ray generating apparatus 12 is an apparatus configured to generate the X-rays and to radiate the generated X-rays onto the patient P. The X-ray generating apparatus 12 includes an X-ray tube (a tube bulb) 12a, a wedge 12b, and a collimator 12c.

The X-ray tube 12a is a vacuum tube configured to receive a supply of high voltage from the X-ray high-voltage apparatus 11 and to emit thermo electrons from a negative pole (which may be referred to as a filament) toward a positive pole (an anode or a target). The X-ray tube 12a is configured to emit an X-ray beam toward the patient P, as the rotating frame 15 rotates. In other words, the X-ray tube 12a is configured to generate the X-rays by using the high voltage supplied from the X-ray high-voltage apparatus 11.

Further, the X-ray tube 12a is configured to generate the X-ray beam that spreads with a fan angle and a cone angle. For example, under control of the X-ray high-voltage apparatus 11, the X-ray tube 12a is capable of continuously emitting X-rays in a full circle around the patient P for a full reconstruction purpose and continuously emitting X-rays in an emission range (180 degrees+the fan angle) that enables a half reconstruction for a half reconstruction purpose. Further, under control of the X-ray high-voltage apparatus 11, the X-ray tube 12a is also capable of intermittently emitting X-rays (pulse X-rays) in positions (X-ray tube positions) set in advance. In addition, the X-ray high-voltage apparatus 11 is also capable of modulating intensities of the X-rays emitted from the X-ray tube 12a. For example, the X-ray high-voltage apparatus 11 is configured to increase the intensities of the X-rays emitted from the X-ray tube 12a in a specific X-ray tube position and to decrease the intensities of the X-rays emitted from the X-ray tube 12a in a range other than the specific X-ray tube position.

The wedge 12b is an X-ray filter for adjusting the X-ray amount of the X-rays emitted from the X-ray tube 12a. More specifically, the wedge 12b is a filter configured to pass and attenuate the X-rays emitted from the X-ray tube 12a so that the X-rays emitted from the X-ray tube 12a onto the patient P has a predetermined distribution. For example, the wedge 12b may be a filter obtained by processing aluminum so as to have a predetermined target angle and a predetermined thickness. The wedge may be referred to as a wedge filter or a bow-tie filter.

The collimator 12c is structured by using lead plates or the like and has a slit in a certain part thereof. For example, under control of the X-ray high-voltage apparatus 11 (explained later), the collimator 12c is configured, by using the slit, to narrow down a radiation range of the X-rays of which the X-ray amount has been adjusted by the wedge 12b.

Possible X-ray sources of the X-ray generating apparatus 12 are not limited to the X-ray tube 12a. For example, instead of the X-ray tube 12a, the X-ray generating apparatus 12 may be structured with: a focus coil configured to converge an electron beam generated by an electron gun, a deflection coil configured to electromagnetically deflect the electron beam, and a target ring that encloses half the circumference around patient P and is configured to generate X-rays from collision with the deflected electron beam.

The X-ray high-voltage apparatus 11 is structured with: a high-voltage generating apparatus configured with electrical circuitry such as a transformer and a rectifier, or the like and having a function of generating the high voltage to be applied to the X-ray tube 12a; and an X-ray controlling apparatus configured to control output voltage corresponding to the X-rays to be emitted by the X-ray tube 12a. The high-voltage generating apparatus may be of a transformer type or an inverter type. For example, the X-ray high-voltage apparatus 11 is configured to adjust the X-ray amount to be emitted onto the patient P, by adjusting X-ray tube voltage and an X-ray tube current to be supplied to the X-ray tube 12a. Further, the X-ray high-voltage apparatus 11 is controlled by processing circuitry 37 of the console 30.

The gantry controlling apparatus 16 is structured with: processing circuitry configured with a Central Processing Unit (CPU) or the like; and a driving mechanism such as a motor and an actuator or the like. The gantry controlling apparatus 16 has a function of controlling operations of the gantry 10 by receiving input signals from an input interface 31 attached to the console 30 or from an input interface attached to the gantry 10. For example, upon receipt of the input signals, the gantry controlling apparatus 16 is configured to exercise control to turn the X-ray tube 12a and the X-ray detector 13 on the circular orbit centered on the patient P by rotating the rotating frame 15; control to tilt the gantry 10; and control to bring the table 20 and a tabletop 22 into operation. The gantry controlling apparatus 16 is controlled by the processing circuitry 37 of the console 30.

Further, in the present embodiment, the gantry controlling apparatus 16 is configured to control the position of the pin hole collimator 17. For example, the gantry controlling apparatus 16 is configured to move the pin hole collimator 17 so that the pin hole collimator 17 is positioned within an emission range of the X-rays emitted from the X-ray tube 12a, at the time of adding a record into a focal point position specifying table 35a (explained later) or updating of the registered contents of a record that is already registered in the focal point position specifying table 35a. In this situation, the time of newly adding the record into the focal point position specifying table 35a and the time of updating the registered contents of the record already registered in the focal point position specifying table 35a each correspond, for example, to a time before the X-ray CT apparatus 1 is delivered to a hospital, after the X-ray tube 12a is replaced, or when the patient P is not placed on the table 20 such as when calibration is carried out. In other words, while no CT scan is being performed, various types of information may be registered into the focal point position specifying table 35a, and the registered contents of the focal point position specifying table 35a may be updated.

Further, the gantry controlling apparatus 16 is configured to control the position of the pin hole collimator 17. For example, the gantry controlling apparatus 16 is configured to move the pin hole collimator 17 so that the pin hole collimator 17 is positioned within an emission range of the X-rays emitted from the X-ray tube 12a, at the time of registering a record into the focal point position specifying table 35a (explained later). In this situation, the time of registering the record into the focal point position specifying table 35a (explained later) corresponds, for example, to a time before the X-ray CT apparatus 1 is delivered to a hospital, a time when the X-ray tube 12a is replaced, or while no CT imaging is being performed such as when calibration is being carried out, i.e., when the patient P is not placed on the table 20.

Further, the gantry controlling apparatus 16 is configured to move the pin hole collimator 17 so that, when CT imaging is not being performed, the pin hole collimator 17 is positioned outside the emission range of the X-rays emitted from the X-ray tube 12a.

The X-ray detector 13 is structured with a plurality of X-ray detecting elements (which may be referred to as "sensors" or simply "detecting elements") and is an example of a photon counting detector (photon counting-type detector) configured to output a signal corresponding to a counted X-ray photon quantity (the quantity of X-ray photons). Further, the X-ray detecting elements are an example of photon counting detecting elements (photon counting-type detecting elements). For example, the X-ray detector 13 is structured with a plurality of arrays of X-ray detecting elements in each of which a plurality of X-ray detecting elements are arranged in a channel direction along an arc while being centered on a focal point of the X-ray tube 12a. The X-ray detector 13 has a structure in which the plurality of arrays of X-ray detecting elements are arranged in a slice direction, while each array has the plurality of X-ray detecting elements arranged in the channel direction. Each of the X-ray detecting elements of the X-ray detector 13 is configured to detect the X-rays that were emitted from the X-ray generating apparatus 12 and have passed through the patient P and to output an electrical signal (a pulse) corresponding to the X-ray amount. Further, the electrical signal output by each of the X-ray detecting elements may be referred to as a detection signal.

An example in which the X-ray detector 13 is a direct conversion-type photon counting detector will be explained. The X-ray detector 13 is a photon counting detector including a plurality of detecting units, while each of the detecting units includes an X-ray detecting element configured to detect X-ray photons and an Application Specific Integrated Circuit (ASIC) connected to the X-ray detecting element and configured to count the X-ray photons detected by the X-ray detecting element.

When an X-ray photon has become incident thereto, each of the X-ray detecting elements is configured to directly convert the X-ray becoming incident to the X-ray detecting element into an electric charge and to output the electric charge to the ASIC.

The ASIC is configured to count the quantity of the X-ray photons that have become incident to the X-ray detecting element by discriminating the individual electric charges output by the X-ray detecting element and to also measure the energy of the counted X-ray photons by performing a computation process based on the magnitude of the individual electric charges. The ASIC is configured to count the quantity of the X-ray photons corresponding to each of a plurality of energy bands (energy binds) and to generate digital data indicating the result of counting the X-ray photons with respect to each of the plurality of energy bands. Further, the ASIC is configured to output the generated digital data to the data acquisition circuitry 14. For example, the digital data output from each of the ASICs is an energy spectrum itself of the X-rays detected by the X-ray detecting element corresponding to one pixel.

With the configuration described above, the X-ray detector 13 is configured to detect the X-ray photons and to obtain energy information. Alternatively, for example, the X-ray detector 13 may be an indirect conversion-type photon counting detector including a grid, a scintillator array, and an optical sensor array. The scintillator array includes a plurality of scintillators, while each of the scintillators is structured with a scintillator crystal that outputs light in a quantity corresponding to incident X-ray energy. The grid is arranged on a surface of the scintillator array positioned on the X-ray incident side and is structured with an X-ray blocking board having a function of absorbing scattered X-rays. The optical sensor array has a function of converting the light from the scintillators into electrical signals corresponding to the light quantities and may be structured with optical sensors such as photomultiplier tubes, for example. In this situation, the optical sensors may be Photodiodes (PDs), Avalanche Photodiodes (APDs) or Silicon Photomultipliers (SiPMs).

The data acquisition circuitry 14 (a Data Acquisition System (DAS)) is circuitry configured to acquire results of the counting process from the X-ray detecting elements in the X-ray detector 13 and to generate detection data (projection data). In other words, the data acquisition circuitry 14 is configured to acquire the counting results obtained by the X-ray detector 13. In this situation, the detection data may be a sinogram, for example. The sinogram is data in which the results of the counting process are arranged, where incident events to the X-ray detecting elements are counted with respect to various positions of the X-ray tube 12a. In other words, the sinogram indicates the result of counting, with respect to each of the energy bands, the X-ray photons that became incident to the X-ray detecting elements, in correspondence with the various positions of the X-ray tube 12a. The data acquisition circuitry 14 is configured to generate the sinogram by acquiring the results of the counting process corresponding to various view angles, from the X-ray detector 13. Further, the data acquisition circuitry 14 is configured to transmit the generated sinogram to the console 30.

The table 20 is an apparatus on which the patient P to be scanned is placed and moved and includes a table driving apparatus 21, the tabletop 22, a pedestal 23, and a base (supporting frame) 24.

The tabletop 22 is a board on which the patient P is placed. The base 24 is configured to support the tabletop 22. The pedestal 23 is a casing configured to support the base 24 so as to be movable in vertical directions. The table driving apparatus 21 is a motor or an actuator configured to move the tabletop 22 over which the patient P is placed in the long axis direction of the tabletop 22 and to move the patient P into the rotating frame 15. The table driving apparatus 21 is also capable of moving the tabletop 22 in the X-axis directions.

As for the method for moving the tabletop, it is acceptable to move only the tabletop 22 or to move the entirety including the base 24 of the table 20. In another example, when standing CT is carried out, it is acceptable to use a method by which a patient moving mechanism corresponding to the tabletop 22 is moved.

For example, the gantry 10 is configured to perform a helical scan in which the patient P is helically scanned by causing the rotating frame 15 to rotate, while the tabletop 22 is moved. In another example, the gantry 10 is configured to perform a conventional scan in which the patient P is scanned with a circular orbit by causing the rotating frame 15 to rotate while the position of the patient P is fixed after the tabletop 22 is moved. In the embodiment described below, changes in the relative position between the gantry 10 and the tabletop 22 are realized by controlling the tabletop 22; however, possible embodiments are not limited to this example. For instance, when the gantry 10 is self-propelled, it is also acceptable to realize the changes in the relative position between the gantry 10 and the tabletop 22 by controlling the traveling of the gantry 10. In another example, it is also acceptable to realize the changes in the relative position between the gantry 10 and the tabletop 22 by controlling the traveling of the gantry 10 and the tabletop 22.

The console 30 is an apparatus configured to receive operations performed by an operator on the X-ray CT apparatus 1 and to reconstruct the X-ray CT image data by using the sinogram (the counting results) acquired by the gantry 10. As illustrated in FIG. 1, the console 30 includes the input interface 31, a display 32, a memory 35, and the processing circuitry 37.

The input interface 31 is configured to receive various types of input operations from the operator, to convert the received input operations into electrical signals, and to output the electrical signals to the processing circuitry 37. For example, the input interface 31 is configured to receive, from the operator, an acquisition condition used at the time of acquiring the projection data, a reconstruction condition used at the time of reconstructing the X-ray CT image data, an image processing condition used at the time of generating image data (post-processing image data) from the X-ray CT image data, and the like. For example, it is possible to realize the input interface 31 by using a mouse, a keyboard, a trackball, a switch, a button, a joystick, and/or the like.

The display 32 is configured to display various types of information. For example, the display 32 is configured to output an image (an X-ray CT image) based on image data generated by the processing circuitry 37, a Graphical User Interface (GUI) for receiving various types of operations from the operator, and the like. For example, it is possible to configure the display 32 by using a liquid crystal display, a Cathode Ray Tube (CRT) display, or the like.

It is possible to realize the memory 35 by using, for example, a semiconductor memory element such as a Random Access Memory (RAM) or a flash memory, or a hard disk, an optical disc, or the like. For example, the memory 35 is configured to store therein the projection data and reconstructed image data. Further, the memory 35 is configured to store therein the focal point position specifying table 35a. The memory 35 is an example of the storage unit. The focal point position specifying table 35a will be explained later.

The processing circuitry 37 is configured to execute, for example, a system controlling function 371, a pre-processing function 372, a reconstruction processing function 373, an image processing function 374, a scan controlling function 375, a display controlling function 376, an obtaining function 377, and a specifying function 378. In this situation, for example, processing functions executed by the constituent elements of the processing circuitry 37 illustrated in FIG. 1, namely, the system controlling function 371, the pre-processing function 372, the reconstruction processing function 373, the image processing function 374, the scan controlling function 375, the display controlling function 376, the obtaining function 377, and the specifying function 378 are recorded in the memory 35 in the form of computer-executable programs. The processing circuitry 37 is realized by using a processor, for example. The processing circuitry 37 is configured to realize the functions corresponding to the programs, by reading the programs from the memory 35 and executing the read programs. In other words, the processing circuitry 37 that has read the programs has the functions illustrated within the processing circuitry 37 in FIG. 1.

The system controlling function 371 is configured to control various functions of the processing circuitry 37 on the basis of the input operations received from the operator via the input interface 31.

The pre-processing function 372 is configured to generate raw data by performing, on the detection data output from the data acquisition circuitry 14, pre-processing processes such as a logarithmic conversion process, an offset correction process, an inter-channel sensitivity correction process, an inter-channel gain correction process, a pile-up correction process, a response function correction process, a beam hardening correction, and/or the like. Further, the pre-processing function 372 is configured to store the raw data into the memory 35.

As mentioned above, the data output from the data acquisition circuitry 14 will be referred to as detection data. The data obtained by performing, on the detection data, the pre-processing processes such as the logarithmic conversion process, the offset correction process, the inter-channel sensitivity correction process, the inter-channel gain correction process, the pile-up correction process, the response function correction process, the beam hardening correction, and/or the like will be referred to as raw data. Further, the detection data and the raw data will collectively be referred to as projection data.

The reconstruction processing function 373 is configured to generate the X-ray CT image data, by performing a reconstructing process that uses a filtered backprojection method or a successive approximation reconstruction method, on the raw data generated by the pre-processing function 372. In this situation, when performing the reconstructing process on the raw data, the reconstruction processing function 373 is configured to use a focal point position of the X-ray tube 12a. The reconstruction processing function 373 is configured to store the X-ray CT image data resulting from the reconstruction, into the memory 35. The reconstruction processing function 373 is an example of a reconstruction processing unit.

In this situation, the projection data generated from the sinogram (the counting results) obtained in the photon counting CT includes information about energy of the X-rays attenuated as a result of passing through the patient P. Accordingly, the reconstruction processing function 373 is capable of reconstructing X-ray CT image data corresponding to a specific energy component, for example. Further, the reconstruction processing function 373 is capable of reconstructing X-ray CT image data corresponding to each of a plurality of energy components, for example.

Further, the reconstruction processing function 373 is configured to generate image data in which a plurality of pieces of X-ray CT image data that are color-coded in accordance with the energy components are superimposed on one another, by assigning, to each of the pixels in the X-ray CT image data corresponding to each of the energy components, a tone corresponding to the energy component. Further, by making use of a k-absorption edge unique to a substance, the reconstruction processing function 373 is capable of generating image data that makes it possible to identify the substance. Other types of image data that can be generated by the reconstruction processing function 373 include monochrome X-ray image data, density image data, and effective atomic number image data.

Further, as an application of X-ray CT, a technique is also known by which the types, the content amounts, the density levels, and the like of substances contained in the patient P are discriminated, by making use of the notion that different substances have different X-ray absorption properties. This process may be called substance discrimination. For example, the reconstruction processing function 373 is configured to perform the substance discrimination on the projection data so as to obtain substance discrimination information. Further, the reconstruction processing function 373 is configured to reconstruct substance discrimination image data representing a substance discrimination image, by using the substance discrimination information which are results of the substance discrimination.

When reconstructing the X-ray CT image data, the reconstruction processing function 373 is capable of adopting a full-scan reconstruction scheme and a half-scan reconstruction scheme. For example, for the full-scan reconstruction scheme, the reconstruction processing function 373 requires projection data corresponding to a full circle around the patient, i.e., 360 degrees. In contrast, for the half-scan reconstruction scheme, the reconstruction processing function 373 requires projection data corresponding to "180 degrees+the fan angle". In the following sections, to simplify the explanations, it will be assumed that the reconstruction processing function 373 is configured to implement the full-scan reconstruction scheme in which the reconstruction is performed by using the projection data corresponding to a full circle around the patient, i.e., 360 degrees.

On the basis of an input operation received from the operator via the input interface 31, the image processing function 374 is configured to convert the X-ray CT image data generated by the reconstruction processing function 373, into various types of image data such as tomographic image data on an arbitrary cross-sectional plane or three-dimensional image data resulting from a rendering process, by using a publicly-known method. Further, when the scan controlling function 375 performs a monitoring scan (explained later), the image processing function 374 is configured to convert the X-ray CT image data into monitoring image data by using a publicly-known method. The image processing function 374 is configured to store various types of image data resulting from the conversion, into the memory 35.

The scan controlling function 375 is configured to control CT scans performed by the gantry 10. For example, the scan controlling function 375 is configured to control the start of the scans, the execution of the scans, and the end of the scans performed by the gantry 10, by controlling operations of the X-ray high-voltage apparatus 11, the X-ray detector 13, the gantry controlling apparatus 16, the data acquisition circuitry 14, and the table driving apparatus 21. More specifically, on the basis of an examination protocol selected by a user such as a radiology technologist or a medical doctor, the scan controlling function 375 is configured to control projection data acquisition processes in a position determining imaging process (a position determining scan) to acquire position determining image data (scanogram image data) representing a position determining image (a scanogram image) and in a main imaging process (a main scan) to acquire image data representing an image to be used for a diagnosing process.

Next, an example of a procedure in which the scan controlling function 375 receives the examination protocol selected by the user will be explained. For example, the scan controlling function 375 is configured to cause the display 32 to display a human body model of the patient P. The user selects a site to be imaged (an imaged site or a site subject to imaging) from among a plurality of sites in the human body model displayed on the display 32, via the input interface 31. After that, the scan controlling function 375 is configured to cause the display 32 to display, in a selectable manner, a plurality of examination protocols that are pre-set for the site to be imaged that was selected by the user. From among the plurality of examination protocols displayed on the display 32, the user selects an examination protocol to be used in the imaging process, via the input interface 31. After that, the scan controlling function 375 is configured to receive the examination protocol selected by the user, as the examination protocol to be used in the imaging process.

The scan controlling function 375 is capable of taking two-dimensional scanogram image data and three-dimensional scanogram image data. For example, the scan controlling function 375 is configured to take the two-dimensional scanogram image data by continuously performing imaging processes, while moving the tabletop 22 at a constant speed and having the X-ray tube 12a fixed to a 0-degree position (a straight-on position with respect to the patient P). Alternatively, the scan controlling function 375 is configured to take the two-dimensional scanogram image data by repeatedly performing imaging processes intermittently in synchronization with the moving of the tabletop 22, while intermittently moving the tabletop 22 and having the X-ray tube 12a fixed to the 0-degree position. In addition, the scan controlling function 375 is also capable of taking scanogram image data, not only from the straight-on position, but also from an arbitrary direction (e.g., a lateral direction) with respect to the patient P. For example, when imaging is performed while the X-ray tube 12a is in a 90-degree position (a position in a lateral direction with respect to the patient P), the patient P is imaged from a lateral side so as to obtain two-dimensional scanogram image data. As for the position of the X-ray tube 12a, it is possible to perform imaging processes from a plurality of arbitrary positions, if necessary.

Further, when taking scanogram image data, the scan controlling function 375 is configured to take the three-dimensional scanogram image data by acquiring projection data corresponding to a full circle around the patient. For example, the scan controlling function 375 is configured to acquire the projection data corresponding to the full circle around the patient, by performing a helical scan or a non-helical scan. In this situation, the scan controlling function 375 is configured to perform the helical scan or the non-helical scan on a wide area of the patient such as the entire chest part, the entire abdomen part, the entire upper half of the body, or the entire body, by using a radiation dose smaller than that for the main scan. As the non-helical scan, for example, a scan based on a step-and-shoot method may be performed.

Furthermore, when performing an angiography examination, the scan controlling function 375 is configured to perform a monitoring scan (monitoring imaging or a prep scan) for observing the density of a contrast agent after the contrast agent is injected into the patient P, on the basis of the examination protocol selected by the user. For example, a iodine contrast agent may be used as the contrast agent. In this situation, the monitoring scan is an imaging process for observing changes in the density of the contrast agent in a region of interest set in a monitoring image, which is a tomographic image of the patient P. During the monitoring scan, the scan controlling function 375 is configured to detect a CT value which increases in accordance with the density of the contrast agent injected into the patient P, in the region of interest set in the monitoring image and to transition into the main scan either automatically or upon receipt of an instruction from the user, as being triggered by the CT value having reached a threshold value. Although the monitoring scan does not contribute to diagnosing processes, the monitoring scan contributes to enhancing image quality of the X-ray CT image data obtained from the main scan, by making it possible to transition into the main scan when the density of the contrast agent is high.

The display controlling function 376 is configured to exercise control so that the display 32 displays images based on various types of image data stored in the memory 35. For example, the display controlling function 376 is configured to cause the display 32 to display the monitoring image based on the monitoring image data.

The obtaining function 377 is configured to obtain information about an energy spectrum of the X-rays emitted from the X-ray tube 12a, at the time of performing the CT scan on the patient P placed on the table 20. The specifying function 378 is configured to specify an actual focal point position, on the basis of the information about the energy spectrum of the X-rays emitted from the X-ray tube 12a that is obtained by the obtaining function 377 while the CT scan is being performed and the focal point position specifying table 35a.

The obtaining function 377 is an example of the obtaining unit. The specifying function 378 is an example of the specifying unit. Details of the obtaining function 377 and the specifying function 378 will be explained later.

Figure 2:
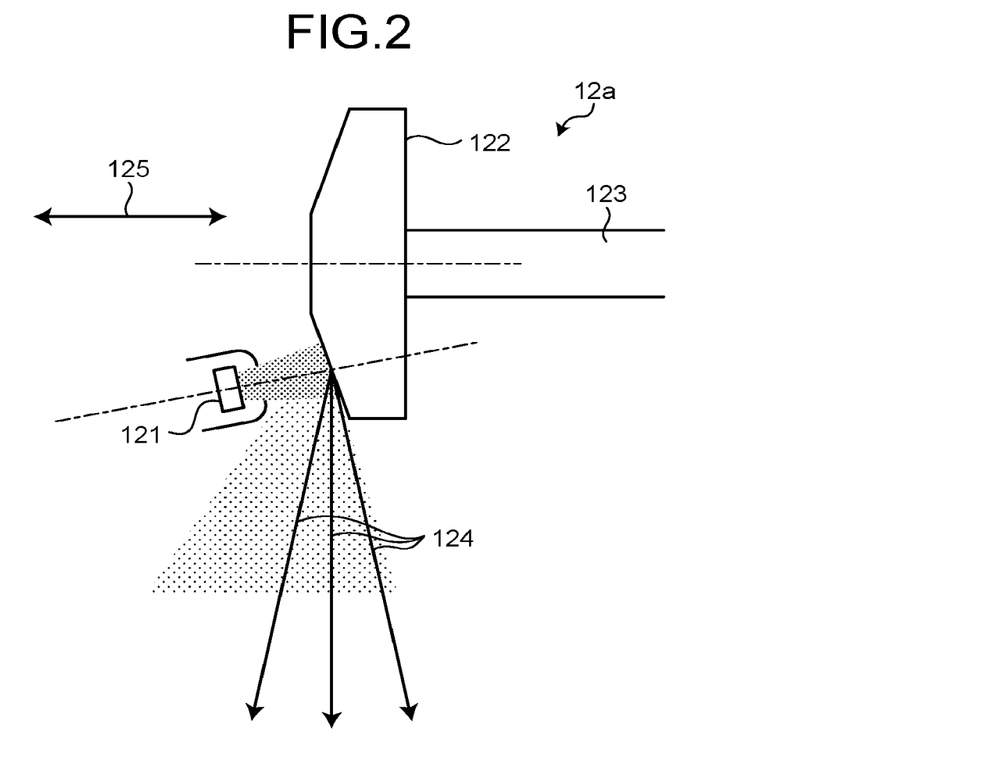
FIG. 2 is a drawing illustrating an exemplary configuration of an X-ray tube according to the first embodiment.

A configuration of the X-ray CT apparatus 1 according to the first embodiment has thus been explained. Next, a detailed configuration of the X-ray tube 12a will be explained, with reference to FIG. 2. FIG. 2 is a drawing illustrating an exemplary configuration of the X-ray tube 12a according to the first embodiment. As illustrated in FIG. 2, in the X-ray tube 12a, a bundle of thermo electrons (an electron beam) is released from a filament 121 on the negative pole (a cathode) toward a target 122 on the positive pole (an anode).

The target 122 is connected to a shaft 123. Accordingly, as the shaft 123 rotates, the target 122 also rotates in conjunction therewith. The target 122 is set at a prescribed angle with respect to a traveling direction of the thermo electrons. The prescribed angle may be referred to as a target angle. While the target 122 is rotating, the thermo electrons emitted from the filament 121 collide with the target 122. When a thermo electron collides with the target 122, the target 122 generates X-rays 124. Accordingly, when the bundle of thermo electrons collides with the target 122, the target 122 generates a bundle of X-rays 124.

The X-rays 124 occur not from the surface of the target 122, but from the inside of the target 122. In other words, inside the target 122, there is a distribution of generation sources of the X-rays 124. A center-of-gravity position of the plurality of generation sources of the plurality of X-rays 124 that are present inside the target 122 serves as the focal point position of the X-ray tube 12a. In this situation, the focal point position of the X-ray tube 12a is a position in a direction parallel to the Z-axis indicated by a bidirectional arrow 125, for example. In this situation, because the Z-axis is a direction parallel to the body axis direction (the slice direction) of the patient P, the direction indicated by the bidirectional arrow 125 is also a direction parallel to the body axis direction of the patient P.

Figure 3:
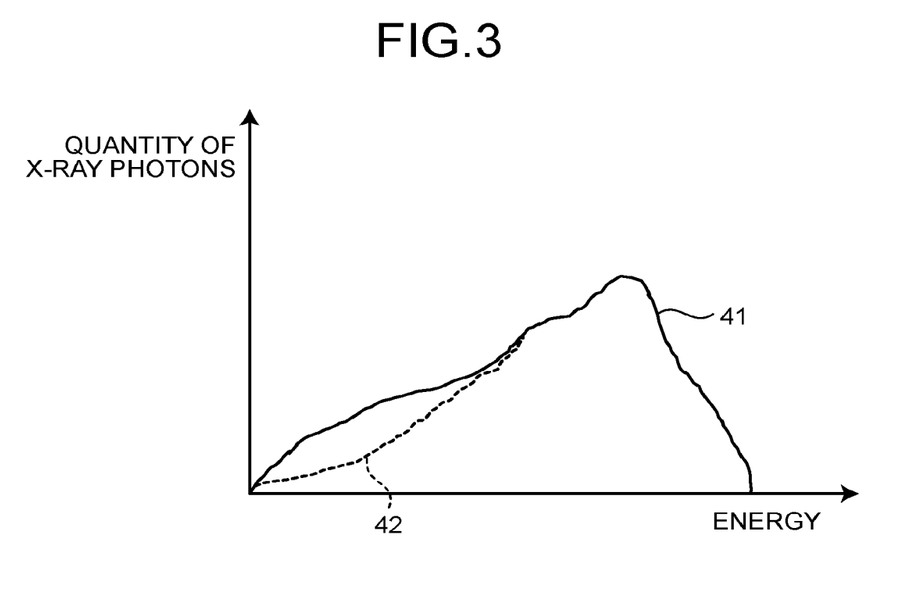
FIG. 3 is a drawing for explaining an example of a heel effect occurring in X-rays emitted from the X-ray tube according to the first embodiment.

Next, a heel effect occurring on the X-rays emitted from the X-ray tube 12a will be explained. FIG. 3 is a drawing for explaining an example of the heel effect occurring on the X-rays emitted from the X-ray tube 12a according to the first embodiment. FIG. 3 illustrates an energy spectrum 41 of the X-rays 124 (X-rays 124 on the cathode side) detected by X-ray detecting elements on the cathode side and an energy spectrum 42 of the X-rays 124 (X-rays 124 on the anode side) detected by X-ray detecting elements on the anode side. As illustrated in FIG. 3, due to the heel effect, the quantity of X-ray photons on the lower energy side of the energy spectrum 42 of the X-rays 124 on the anode side is smaller than the quantity of X-ray photons on the lower energy side of the energy spectrum 41 of the X-rays 124 on the cathode side. Accordingly, an average value (average energy) of the values of the energy spectrum 42 is higher than an average value (average energy) of the values of the energy spectrum 41.

In this situation, during a CT scan, due to thermal expansion of the shaft 123 or the like, the target 122 may move toward the left side of the two directions indicated by the bidirectional arrow 125 in FIG. 2. When the target 122 moves, the focal point position also moves. In that situation, in accordance with the change of the focal point position, the energy spectrum output from any single X-ray detecting element also changes. For example, when the focal point position has moved toward the left side of the two directions indicated by the bidirectional arrow 125, the quantity of the X-ray photons on the lower energy side of the energy spectrum output from the X-ray detecting element is smaller than the quantity of the X-ray photons on the lower energy side of the energy spectrum exhibited prior to the moving of the focal point position. Accordingly, an average of the energy spectrum values output from the X-ray detecting element is larger than an average of the energy spectrum values exhibited prior to the moving of the focal point position.

Consequently, the energy spectrum itself and information about the energy spectrum of the X-rays such as the average of the energy spectrum values correspond to the focal point position of the X-ray tube 12a. As a result, it is possible to specify the focal point position of the X-ray tube 12a, on the basis of the information about the energy spectrum of the X-rays.

Thus, before performing a CT scan, the X-ray CT apparatus 1 according to the first embodiment has stored, in the memory 35, the focal point position specifying table 35a which registers the information about the energy spectrum of the X-rays in correspondence with information about focal point positions of the X-ray tube 12a. Further, when performing the CT scan, the X-ray CT apparatus 1 is configured to obtain information about an energy spectrum of the X-rays emitted from the X-ray tube 12a. After that, on the basis of the obtained information about the energy spectrum of the X-rays and the registered contents of the focal point position specifying table 35a, the X-ray CT apparatus 1 is configured to specify information about the most up-to-date focal point position of the X-ray tube 12a and to perform the reconstructing process by using the specified information about the focal point position. As a result, during the CT scan, the X-ray CT apparatus 1 according to the first embodiment is able to specify the information about the focal point position of the X-ray tube 12a without using the pin hole collimator 17. In the following sections, details of a configuration of the X-ray CT apparatus 1 according to the first embodiment and processes performed by the X-ray CT apparatus 1 will be explained.

Figure 4:
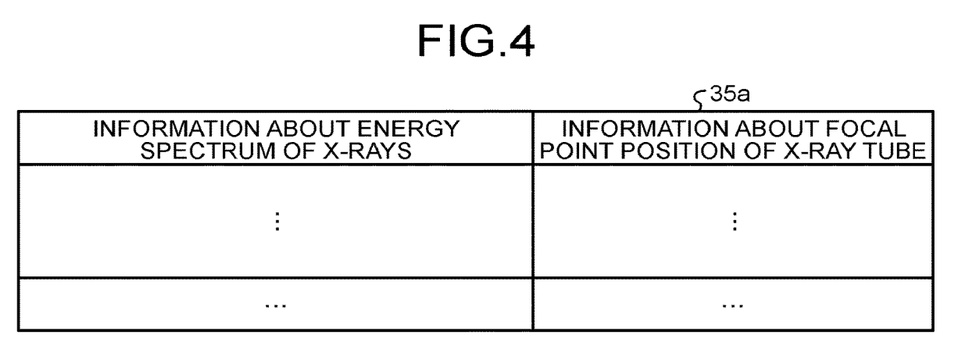
FIG. 4 is a drawing illustrating an example of a data structure of a focal point position specifying table according to the first embodiment.

FIG. 4 is a drawing illustrating an example of a data structure of the focal point position specifying table 35a according to the first embodiment. As illustrated in FIG. 4, the focal point position specifying table 35a has registered therein a plurality of records each having items such as "information about the energy spectrum of the X-rays" and "information about the focal point position of the X-ray tube". For instance, examples of the timing with which the various types of information are registered into the focal point position specifying table 35a include a time before the X-ray CT apparatus 1 is delivered to a hospital, after the X-ray tube 12a is replaced, and when calibration is carried out.

Registered under the item "information about the energy spectrum of the X-rays" is information about the energy spectrum of the X-rays output from a detecting unit 13a illustrated in FIG. 1.

For example, the detecting unit 13a is a detecting unit that is among the plurality of detecting units (the X-ray detecting elements and the ASICs) of the X-ray detector 13 described above and that corresponds to one pixel while being positioned so as to be able to detect X-rays that have not passed through the patient P. In an example, the detecting unit 13a is a detecting unit positioned at an end part in terms of the channel direction.

For example, the detecting unit 13a is configured to detect the X-rays emitted from the X-ray tube 12a, as a result of the X-ray tube 12a receiving, from the X-ray high-voltage apparatus 11, a supply of X-ray tube voltage of the same magnitude as that used in a CT scan. Further, the detecting unit 13a is configured to output the energy spectrum of the detected X-rays to the data acquisition circuitry 14. The data acquisition circuitry 14 is configured to transmit the sinogram (the detection data) including the energy spectrum of the X-rays detected by the detecting unit 13a, to the console 30. The pre-processing function 372 of the console 30 is configured to generate the raw data by performing the pre-processing processes described above on the detection data. From the raw data, the obtaining function 377 is configured to specify the energy spectrum of the X-rays detected by the detecting unit 13a. After that, the obtaining function 377 is configured to register the specified energy spectrum of the X-rays, under the item "information about the energy spectrum of the X-rays". In this situation, the obtaining function 377 may be configured to calculate an average of the values of the specified energy spectrum of the X-rays as an average energy value and to register the calculated average energy value under the item "information about the energy spectrum of the X-rays". In this manner, the obtaining function 377 has registered the information about the energy spectrum of the X-rays detected by the detecting unit 13a, under the item "information about the energy spectrum of the X-rays". The information registered under the item "information about the energy spectrum of the X-rays" is an example of the first information about the energy spectrum of the X-rays.

Further, the obtaining function 377 is configured to obtain the focal point position of the X-ray tube 12a corresponding to the time when the X-rays are detected by the detecting unit 13a. For example, as described above, the pin hole collimator 17 is arranged in the emission range of the X-rays emitted from the X-ray tube 12a. Further, by using a publicly-known technique such as that disclosed in Japanese Patent Application Laid-open No. 2016-034373, the obtaining function 377 is configured to obtain the focal point position of the X-ray tube 12a by using the pin hole collimator 17.

After that, the obtaining function 377 is configured to register the obtained focal point position under the item "information about the focal point position of the X-ray tube". The focal point position registered under the item "information about the focal point position of the X-ray tube" is an example of the second information about the focal point position of the X-ray tube 12a. As a result, the information about the energy spectrum of the X-rays detected by the detecting unit 13a and the information about the focal point position of the X-ray tube 12a have been registered in the focal point position specifying table 35a while being kept in correspondence with each other. Further, the focal point position specifying table 35a registers therein a plurality of focal point positions and information about X-ray energy spectra respectively corresponding to the plurality of focal point positions, so as to be kept in correspondence with one another.

Figure 5:
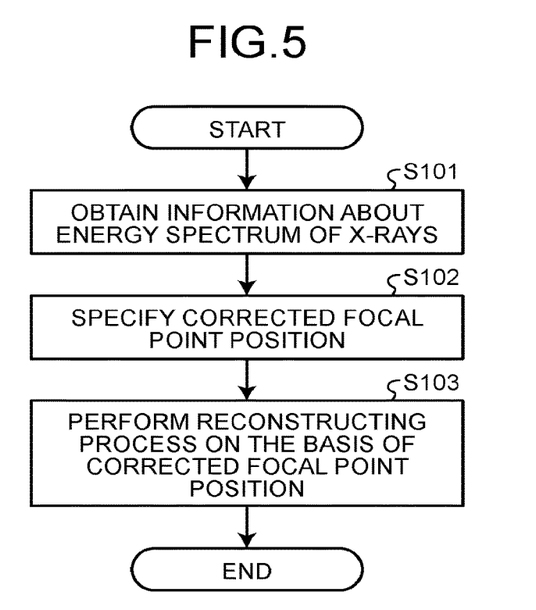
FIG. 5 is a flowchart for explaining an example of a flow of processes in which the X-ray CT apparatus according to the first embodiment performs a CT scan.

Next, an example will be explained in which the X-ray CT apparatus 1 performs a CT scan on the patient P. FIG. 5 is a flowchart for explaining an example of a flow of processes in which the X-ray CT apparatus 1 according to the first embodiment performs the CT scan. It is assumed that the magnitude of the X-ray tube voltage supplied to the X-ray tube 12a when the X-ray CT apparatus 1 performs the CT scan is equal to the magnitude of the X-ray tube voltage supplied to the X-ray tube 12a when the various types of information are registered into the focal point position specifying table 35a. Further, the processes illustrated in FIG. 5 are processes for generating X-ray CT image data corresponding to one frame. Thus, when the X-ray CT apparatus 1 is to generate X-ray CT image data corresponding to a plurality of frames, the processes illustrated in FIG. 5 are repeatedly performed multiple times.

For example, as illustrated in FIG. 5, the X-ray CT apparatus 1 obtains information about the energy spectrum of the X-rays, by using the same method as the method for obtaining the information about the energy spectrum of the X-rays to be registered into the focal point position specifying table 35a (step S101).

The process at step S101 will be explained more specifically. For example, the detecting unit 13a detects the X-rays emitted from the X-ray tube 12a. Further, the detecting unit 13a outputs the energy spectrum of the detected X-rays to the data acquisition circuitry 14. The detecting unit 13a in the present example is an example of the correction-purpose detector. The data acquisition circuitry 14 transmits the detection data including the energy spectrum of the X-rays detected by the detecting unit 13a, to the console 30. The pre-processing function 372 generates the raw data by performing the abovementioned pre-processing processes on the detection data. By specifying the energy spectrum of the X-rays detected by the detecting unit 13a from the raw data, the obtaining function 377 obtains the energy spectrum of the X-rays detected by the detecting unit 13a. In this situation, the obtaining function 377 may obtain an average energy spectrum value of the X-rays by calculating an average of the energy spectrum values of the X-rays detected by the detecting unit 13a. In this manner, the obtaining function 377 has obtained the information (the third information) about the energy spectrum of the X-rays emitted from the X-ray tube 12a, on the basis of the output of the detecting unit 13a.

Subsequently, the specifying function 378 specifies an actual focal point position (a corrected focal point position), on the basis of the information about the energy spectrum of the X-rays obtained at step S101 and the focal point position specifying table 35a (step S102). For example, from among all the records in the focal point position specifying table 35a, the specifying function 378 specifies a record in which the information about the energy spectrum of the X-rays obtained at step S101 is registered under the item "information about the energy spectrum of the X-rays". After that, the specifying function 378 specifies the actual focal point position of the X-ray tube, by obtaining the focal point position of the X-ray tube registered under the item "information about the focal point position of the X-ray tube" in the specified record.

By using the focal point position of the X-ray tube 12a specified at step S102, the reconstruction processing function 373 generates X-ray CT image data by performing the reconstructing process on the raw data generated by the pre-processing function 372 (step S103), and the processes illustrated in FIG. 5 thus end. In other words, the reconstruction processing function 373 is configured to perform the reconstructing process on the basis of the focal point position of the X-ray tube 12a specified at step S102.

The X-ray CT apparatus 1 according to the first embodiment has thus been explained. The X-ray CT apparatus 1 according to the first embodiment is able to specify, during the CT scan, the information about the focal point position of the X-ray tube 12a, without using the pin hole collimator 17.

Modification Example of First Embodiment

In the first embodiment described above, the examples were explained in which the X-ray CT apparatus 1 is configured to specify the information registered as the "information about the energy spectrum of the X-rays" in the focal point position specifying table 35a by using the detecting unit 13a included in the X-ray detector 13 and is configured to obtain the information about the energy spectrum of the X-rays at step S101 in the processes illustrated in FIG. 5. However, the X-ray CT apparatus 1 may perform the same processes by using a detecting unit provided separately from the plurality of detecting units structuring the X-ray detector 13. Thus, this modification example will be explained as a modification example of the first embodiment. In the description of the modification example of the first embodiment, differences from the first embodiment will primarily be explained. Explanations of some of the constituent elements that are the same as those in the first embodiment may be omitted.

Figure 6:
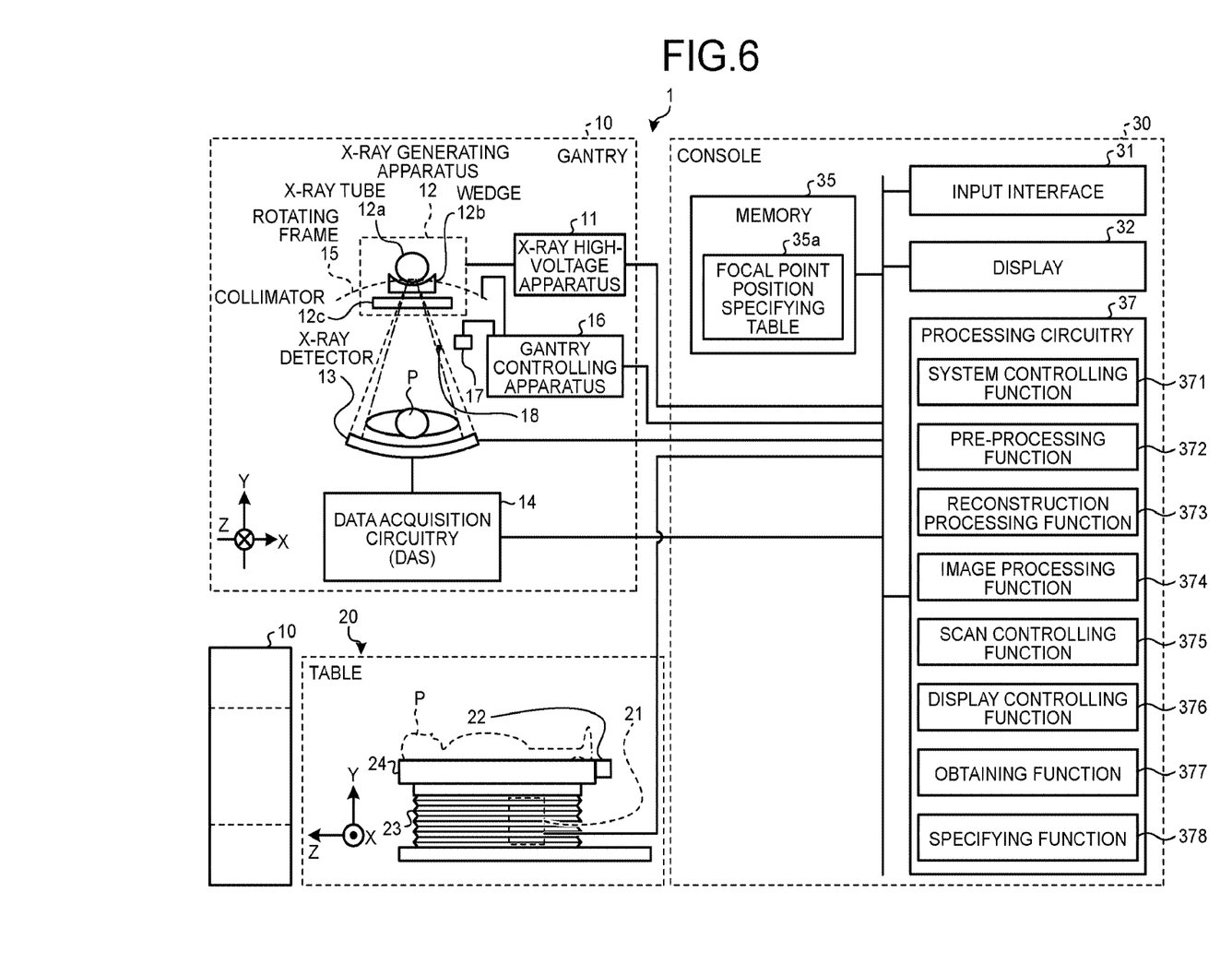
FIG. 6 is a diagram illustrating an exemplary configuration of an X-ray CT apparatus according to a modification example of the first embodiment.

FIG. 6 is a diagram illustrating an exemplary configuration of the X-ray CT apparatus 1 according to the modification example of the first embodiment. As illustrated in FIG. 6, the X-ray CT apparatus 1 according to the modification example of the first embodiment is different from the X-ray CT apparatus 1 according to the first embodiment illustrated in FIG. 1 for including a detecting unit 18 in place of the detecting unit 13a.

The detecting unit 18 has the same configuration as that of the detecting unit 13a, except that the detecting unit 18 is provided separately from the plurality of detecting units structuring the X-ray detector 13. More specifically, the detecting unit 18 is provided in a position where it is possible to detect X-rays that have not passed through the patient P. Further, the detecting unit 18 is connected to the data acquisition circuitry 14. In the present modification example, by using the detecting unit 18, the X-ray CT apparatus 1 is configured to specify the information to be registered as "information about the energy spectrum of the X-rays" in the focal point position specifying table 35a and to obtain the information about the energy spectrum of the X-rays at step S101 in the processes illustrated in FIG. 5, similarly to the first embodiment.

The X-ray CT apparatus 1 according to the modification example of the first embodiment has thus been explained. The X-ray CT apparatus 1 according to the modification example of the first embodiment is able to specify, during the CT scan, the information about the focal point position of the X-ray tube 12a without using the pin hole collimator 17, similarly to the X-ray CT apparatus 1 according to the first embodiment.

Second Embodiment

In the first embodiment and the modification example of the first embodiment described above, the examples were explained in which the X-ray CT apparatus 1 is configured to perform the various types of processes by using the detecting unit 13a or 18 as a correction-purpose detector including the photon counting detecting element. However, the X-ray CT apparatus 1 may be configured to perform various types of processes by using a correction-purpose detector including a plurality of integration-type detecting elements. Thus, this embodiment will be explained as a second embodiment. In the description of the second embodiment, differences from the first embodiment and the modification example of the first embodiment will primarily be explained. Explanations of some of the constituent elements that are the same as those in the first embodiment or the modification example of the first embodiment may be omitted.

Figure 7:
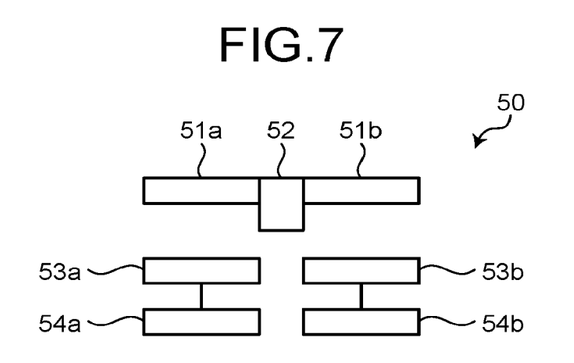
FIG. 7 is a diagram illustrating an exemplary configuration of a correction-purpose detector included in an X-ray CT apparatus according to a second embodiment.

FIG. 7 is a diagram illustrating an exemplary configuration of a correction-purpose detector 50 included in the X-ray CT apparatus 1 according to the second embodiment. In the second embodiment, the X-ray CT apparatus 1 is different from the X-ray CT apparatus 1 according to the first embodiment illustrated in FIG. 1 and from the X-ray CT apparatus 1 according to the modification example of the first embodiment illustrated in FIG. 6 for including the correction-purpose detector 50 in place of the detecting units 13a and 18.

Similarly to the detecting unit 18 described above, the correction-purpose detector 50 is arranged in a position where it is possible to detect X-rays that have not passed through the patient P. As illustrated in FIG. 7, the correction-purpose detector 50 includes a plurality of filters 51a and 51b, a blocking member 52, a plurality of integration-type X-ray detecting elements (integration-type detecting elements) 53a and 53b, and a plurality of DASs 54a and 54b.

In the description below, the X-rays that become incident to the plurality of filters 51a and 51b from the X-ray tube 12a and a radiation amount thereof per unit area will be referred to as filter incident X-rays and a filter incident X-ray amount, respectively. Further, the X-rays that pass through either one of the plurality of filters 51a and 51b and become incident to either one of the plurality of X-ray detecting elements 53a and 53b and a radiation amount thereof per unit area will be referred to as channel incident X-rays and a channel incident X-ray amount, respectively.

The plurality of filters 51a and 51b are provided so that the X-rays (the filter incident X-rays) from the X-ray tube 12a become incident thereto. Provided between the plurality of filters 51a and 51b is the blocking member 52. The plurality of filters 51a, 51b, and the blocking member 52 are integrally supported by a supporting member (not illustrated) such as a rigid frame, for example.

The plurality of filters 51a and 51b are configured to adjust, respectively, the radiation amounts (the channel incident X-ray amounts) of the X-rays emitted onto the plurality of X-ray detecting elements 53a and 53b from the X-ray tube 12a. More specifically, each of the plurality of filters 51a and 51b is configured attenuate the filter incident X-rays so that the energy spectrum of the channel incident X-rays has a predetermined distribution. In this situation, the energy spectrum indicates a relationship between the energy or a wavelength (photon energy) of the X-rays and the intensity (the quantity of photons) of the X-rays. The plurality of filters 51a and 51b have mutually-different X-ray blocking capabilities. In other words, the energy spectra of the X-rays (the channel incident X-rays) that have passed through the plurality of filters 51a and through 51b are different from each other. As the plurality of filters 51a and 51b, for example, it is possible to use metal plates of copper, tungsten, aluminum, or the like, for example. In the example in FIG. 7, the filters 51a and 51b have mutually-different X-ray blocking capabilities.

The X-ray blocking capabilities of the plurality of filters 51a and 51b may be varied by the materials thereof or may be varied by the thicknesses thereof (X-ray transmission path lengths in the filters 51a and 51b).

The blocking member 52 is configured to block scattered X-rays occurring in the filter 51a so that the scattered X-rays will not be detected by the X-ray detecting element 53b other than the corresponding X-ray detecting element 53a. Also, the blocking member 52 is configured to block scattered X-rays occurring in the filter 51b so that the scattered X-rays will not be detected by the X-ray detecting element 53a other than the corresponding X-ray detecting element 53b. For example, as the blocking member 52, it is possible to use a metal plate of lead or the like, for example, having a high electron density.

Each of the plurality of X-ray detecting elements 53a and 53b is provided so that the X-rays (the channel incident X-rays) that have passed through the corresponding one of the plurality of filters 51a and 51b become incident thereto. Each of the plurality of X-ray detecting elements 53a and 53b is configured to generate an electrical signal corresponding to the X-rays that have passed through the corresponding one of the plurality of filters 51a and 51b. Each of the plurality of X-ray detecting elements 53a and 53b includes a scintillator and an optical sensor.

The scintillator is formed by using, for example, sodium iodide (NaI) or bismuth germanate (BGO) as a material thereof. One of the surfaces of each of the scintillators functions as an X-ray incident surface. The optical sensor is provided on the surface (hereinafter "joint surface") opposite from the incident surface of the scintillator. The scintillator absorbs energy of the X-ray photons that become incident through the incident surface and generates fluorescent light (scintillation light). The generated scintillation light has energy corresponding to the energy of the X-ray photons from which the scintillation light was derived. The scintillation light propagates through the inside of the scintillator and reaches the optical sensor via the joint surface.

For example, the optical sensor is a light receiving element such as a Photodiode (PD) or a Photomultiplier Tube (PMT). The optical sensor is configured to generate a current signal having an electric charge amount corresponding to the energy of the scintillation light received from the corresponding scintillator. The generated current signal is a charge pulse.

In this manner, each of the plurality of X-ray detecting elements 53a and 53b is configured to convert the intensity of the channel incident X-rays into the electric charge amount of the current signal. The generated current signal is supplied to a corresponding one of the plurality of DASs 54a and 54b.

Each of the plurality of DASs 54a and 54b is configured to receive an input of the analog electrical signal (the current signal) from the corresponding one of the plurality of X-ray detecting elements 53a and 53b. Each of the plurality of DASs 54a and 54b includes an integrator and an analog/digital (A/D) converter (ADC).

The integrator includes a resistor, a capacitor, and an amplifier, for example. The integrator is configured to receive an input of the electrical signal (the current signal) from the corresponding one of the plurality of X-ray detecting elements 53a and 53b. The integrator is configured to integrate (add up) the charge pulses (the current signals) read from the corresponding one of the X-ray detecting elements during a prescribed period of time. The prescribed period of time is set in accordance with a time period corresponding to one view, for example. In the following sections, the integrated charge pulses will be referred to as an integration signal. The generated analog integration signal (the current signal) is supplied to the corresponding one of the ADCs via corresponding I/V converting circuitry (not illustrated).

Each of the ADCs is configured to receive an input of an analog integration signal (a voltage signal) from the corresponding one of the integrators via the corresponding I/V converting circuitry (not illustrated). Each of the ADCs is configured to generate a digital integration signal by performing an A/D conversion on the input analog integration signal. The ADCs have an input range that is in common and are set in advance as a range of processable electrical signals. The input range is, for example, a range having magnitude (e.g., amplitude) related to electrical signals. The amplitude of an electrical signal indicates a voltage value of the analog integration signal. The generated digital electrical signal is transmitted to the console 30.

As explained above, each of the plurality of DASs 54a and 54b is configured to transmit the electrical signal corresponding to the X-rays received from the X-ray tube 12a, to the console 30.

The pre-processing function 372 of the console 30 is configured to generate raw data by performing various types of pre-processing processes on the electrical signals transmitted thereto from the ADCs. More specifically, the pre-processing function 372 is configured to generate first raw data by performing various types of pre-processing processes on the electrical signal transmitted thereto from the DAS 54a. Also, the pre-processing function 372 is configured to generate second raw data by performing various types of pre-processing processes on the electrical signal transmitted thereto from the DAS 54b.

After that, the obtaining function 377 is configured to calculate a ratio between the first raw data and the second raw data. For example, as the ratio between the first raw data and the second raw data, the obtaining function 377 is configured to calculate either data obtained by dividing the first raw data by the second raw data or data obtained by dividing the second raw data by the first raw data.

In this situation, in accordance with changes of the focal point position, the ratio between the first raw data and the second raw data also changes. In other words, the ratio between the first raw data and the second raw data is information about the energy spectrum of the X-rays. Accordingly, the ratio between the first raw data and the second raw data corresponds to the focal point position of the X-ray tube 12a. It is therefore possible to specify the focal point position of the X-ray tube 12a on the basis of the information about the ratio between the first raw data and the second raw data.

Accordingly, in the second embodiment, the obtaining function 377 is configured to register the ratio between the first raw data and the second raw data under the item "information about the energy spectrum of the X-rays" in the focal point position specifying table 35a. The ratio between the first raw data and the second raw data registered under the item "information about the energy spectrum of the X-rays" is an example of the first information about the energy spectrum of the X-rays.

Further, in the second embodiment, at step S101 in the processes illustrated in FIG. 5, the obtaining function 377 obtains the ratio between the first raw data and the second raw data by calculating the ratio between the first raw data and the second raw data while using the same method as described above. In this manner, the obtaining function 377 is configured to obtain information (the third information) about the energy spectrum of the X-rays emitted from the X-ray tube 12a, on the basis of the outputs from the plurality of integration-type X-ray detecting elements (the integration-type detecting elements) 53a and 53b.

The ratio between the first raw data and the second raw data calculated by using the above method is a ratio between the plurality of signals output from the plurality of X-ray detecting elements 53a and 53b configured to detect the X-rays emitted from the X-ray tube 12a.

The X-ray CT apparatus 1 according to the second embodiment has thus been explained. Similarly to the X-ray CT apparatus 1 according to the first embodiment and the X-ray CT apparatus 1 according to the modification example of the first embodiment, the X-ray CT apparatus 1 according to the second embodiment is able to specify, during the CT scan, the information about the focal point position of the X-ray tube 12a, without using the pin hole collimator 17.

Further, in the second embodiment, the X-ray CT apparatus 1 may reconstruct the X-ray CT image data by using an integration-type detector as the X-ray detector 13.

The term "processor" used in the above explanations denotes, for example, a Central Processing Unit (CPU), a Graphics Processing Unit (GPU), or circuitry such as an Application Specific Integrated Circuit (ASIC) or a Programmable Logic device (e.g., a Simple Programmable Logic Device (SPLD), a Complex Programmable Logic Device (CPLD), or a Field Programmable Gate Array (FPGA)). One or more processors are configured to realize the functions by reading and executing the programs saved in the memory 35. In this situation, instead of having the programs saved in the memory 35, it is also acceptable to directly incorporate the programs in the circuitry of the one or more processors. In that situation, the one or more processors are configured to realize the functions by reading and executing the programs incorporated in the circuitry thereof. Further, the processors in the present embodiments do not each necessarily have to be structured as a single piece of circuitry. It is also acceptable to structure one processor by combining together a plurality of pieces of independent circuitry so as to realize the functions thereof.

According to at least one aspect of the embodiments and the modification examples described above, the X-ray CT apparatus 1 is able to specify, during the CT scan, the information about the focal point position of the X-ray tube 12a, without using the pin hole collimator 17.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An X-ray Computed Tomography (CT) apparatus, comprising:
    a memory storing therein a table keeping first information about an energy spectrum of X-rays in correspondence with second information about a focal point position of an X-ray tube; and
    processing circuitry configured to
        obtain third information about an energy spectrum of X-rays emitted from the X-ray tube; and
        specify a corrected focal point position based on the third information and the table.

2. The X-ray CT apparatus according to claim 1, wherein the processing circuitry is further configured to perform a reconstructing process based on the corrected focal point position.

3. The X-ray CT apparatus according to claim 1, further comprising:
    a correction-purpose detector configured to detect the X-rays emitted from the X-ray tube, wherein
    the processing circuitry is further configured to obtain the third information based on of an output of the correction-purpose detector.

4. The X-ray CT apparatus according to claim 3, wherein the correction-purpose detector includes a plurality of integration detectors.

5. The X-ray CT apparatus according to claim 4, wherein the first information and the third information are each a ratio between a plurality of signals output from the plurality of integration detectors, which are configured to detect the X-rays emitted from the X-ray tube.

6. The X-ray CT apparatus according to claim 5, wherein the plurality of signals are two signals, and
    the ratio between the plurality of signals is a ratio obtained by dividing one signal among the two signals by another signal among the two signals.

7. The X-ray CT apparatus according to claim 3, wherein the correction-purpose detector includes a photon-counting detector.

8. The X-ray CT apparatus according to claim 1, wherein the first information and the third information are each one selected from between the energy spectrum of the X-rays emitted from the X-ray tube and an average of values of the energy spectrum of the X-rays emitted from the X-ray tube.

* * * * *